(12) United States Patent
Kunstadt

(10) Patent No.: US 8,627,937 B2

(45) Date of Patent: Jan. 14, 2014

(54) POWER-TRANSMISSION CLUTCH

(76) Inventor: Robert M. Kunstadt, New York, NY (US)

( * ) Notice: Subject to any disclaimer, the term of this patent is extended or adjusted under 35 U.S.C. 154(b) by 407 days.

(21) Appl. No.: 12/930,763

(22) Filed: Jan. 18, 2011

(65) Prior Publication Data

US 2012/0181133 A1   Jul. 19, 2012

(51) Int. Cl.
*F16D 13/22* (2006.01)
*F16D 13/64* (2006.01)

(52) U.S. Cl.
USPC ..................................... 192/66.3; 192/109 B

(58) Field of Classification Search
USPC .............. 192/66.3–66.32, 56.6, 109 A, 109 B
See application file for complete search history.

(56) References Cited

U.S. PATENT DOCUMENTS

| | | | | |
|---|---|---|---|---|
| 668,166 A | * | 2/1901 | Diehl et al. ................... | 192/66.3 |
| 835,373 A | * | 11/1906 | Stacks ........................ | 192/70.15 |
| 1,395,289 A | * | 11/1921 | O'Leary ..................... | 192/55.3 |
| 3,085,667 A | * | 4/1963 | Lang ............................ | 192/66.3 |
| 3,584,719 A | * | 6/1971 | Upchurch ................. | 192/107 R |

OTHER PUBLICATIONS

Norton, "Machine Design—An Integrated Approach", Pearson Prentice Hall, Third Edition 2006, pp. 879-881.

* cited by examiner

*Primary Examiner* — David D Le
*Assistant Examiner* — Jacob S Scott

(57) ABSTRACT

A clutch comprises two plates each connected to a respective shaft, so that rotary power may be transmitted. One shaft exerts engagement force near the center of the first plate, whereas the second shaft exerts engagement force about the circumference of the second plate. In this manner it is provided that the first plate tends to deform convexly, whereas the second plate tends to deform concavely, as the plates approach and then engage each other. Due to the geometry resulting from the deformation of the plates, engagement surfaces on the first plate are urged towards receiving surfaces on the second plate, with said surfaces entering into firm contact with each other, as said plates deform convexly and concavely respectively; despite the fact that when the plates are undeformed, there may be clearance rather than interference between said surfaces so that rotation is not transmitted between the plates.

6 Claims, 5 Drawing Sheets

POWER-TRANSMISSION CLUTCH

FIELD OF THE INVENTION

This invention relates to the field of devices for selectively-interruptible transmission of rotary power.

SUMMARY OF THE INVENTION

Rotary power may be transmitted from one shaft to another in a selectively-interruptible manner, through a connection means of the type generally termed a clutch. The clutch requires few parts and may be easily and inexpensively machined, cast or molded. In one embodiment it may be activated by axial pressure exerted on the shafts themselves. The clutch comprises flexible members that resiliently deform for engagement and disengagement and which are arranged to exert leverage beneficially upon their respective opposed mating surfaces to provide positive contact when desired, while allowing speedy disengagement with only small displacement.

DETAILED DESCRIPTION OF THE INVENTION

Figure 1:
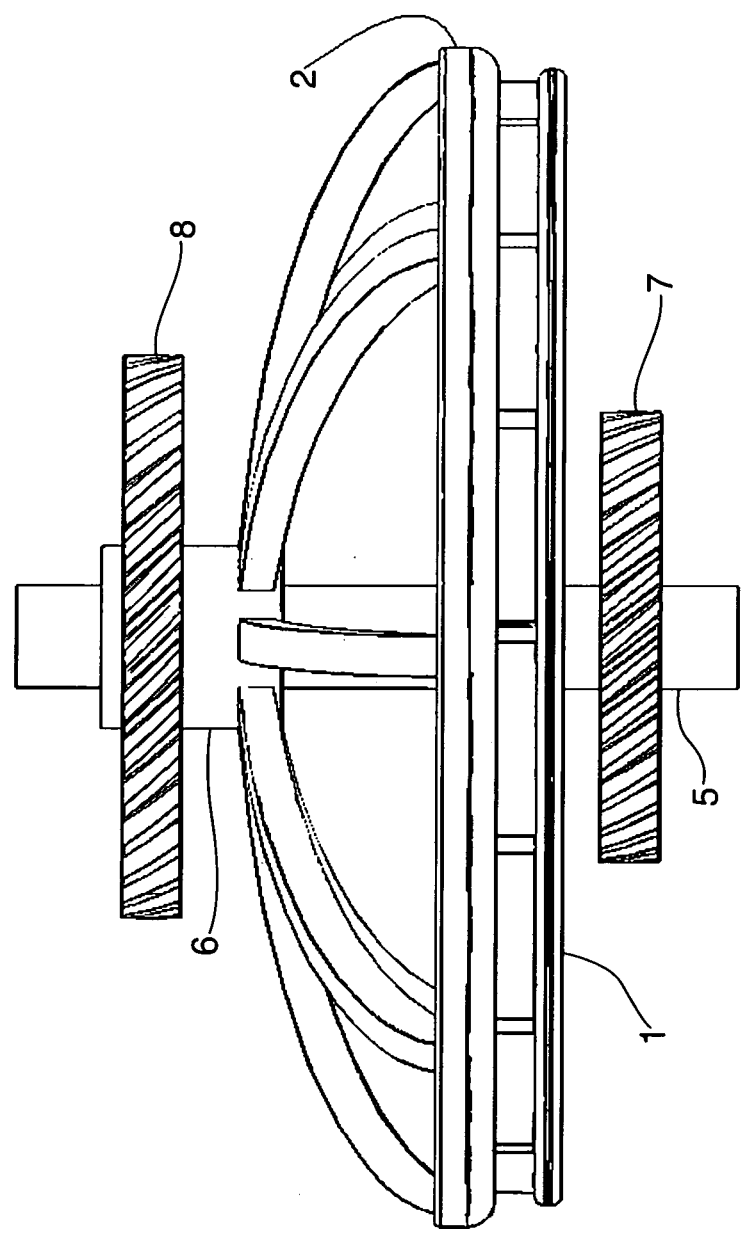
FIG. 1 is a side elevation of an embodiment of the invention.
Figure 2:
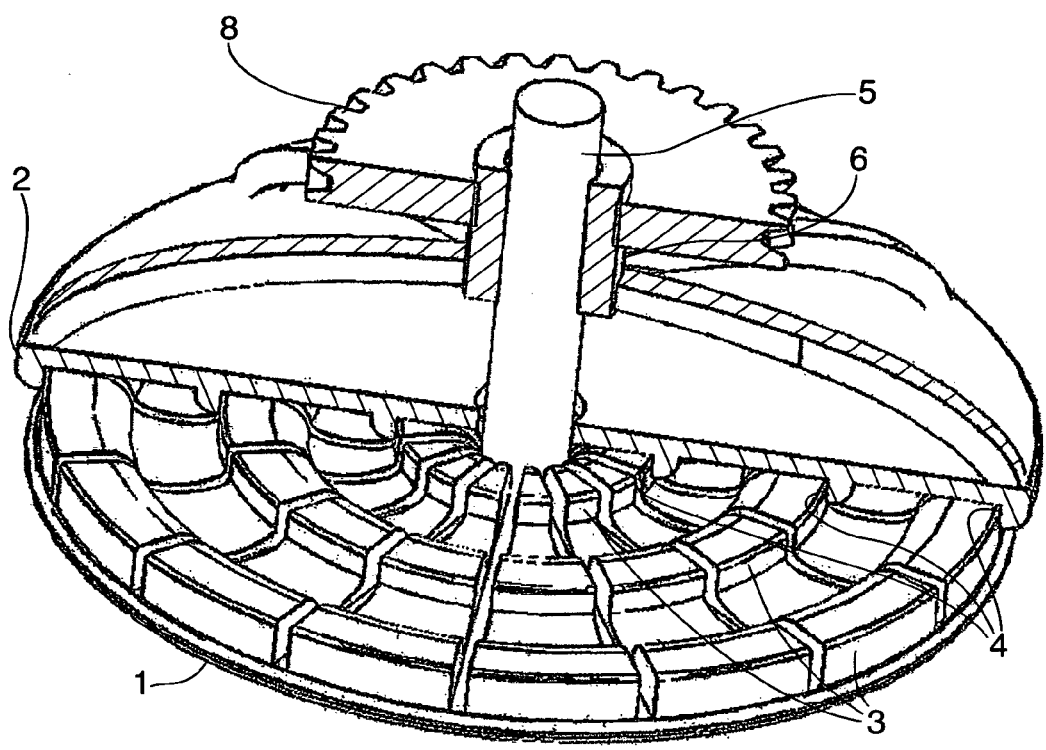
FIG. 2 is a partial cutaway of the embodiment of FIG. 1, in perspective.
Figure 3:
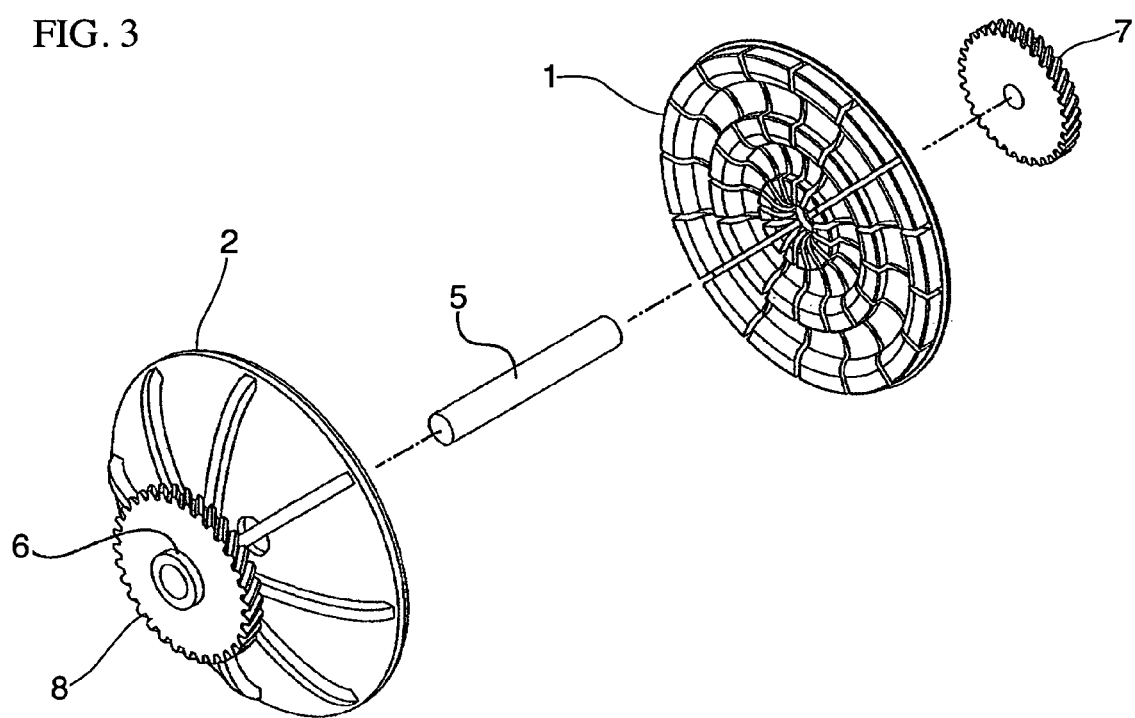
FIG. 3 is a partially-exploded view of the embodiment of FIG. 1.

Referring now to FIGS. 1-5, the invention will be described in detail.

In one embodiment, a clutch comprises two opposing plates 1 and 2.

In their unengaged positions, plates 1 and 2 do not contact or otherwise interfere with each other in any substantial manner.

Plate 1 is configured for displacement towards plate 2 in such fashion (explained further below) that as plate 1 is displaced, it deforms to a convex surface. Plate 2, in contrast, deforms to a concave surface.

Accordingly, as plate 1 deforms its engagement surfaces 3 are urged into contact with receiving surfaces 4 of plate 2. Plates 1 and 2 engage firmly to each other as a result, so that rotary motion of plate 1 can be transmitted to plate 1 in their engaged state; and vice versa.

The person skilled in the art will understand that the clearance between plates 1 and 2 in their non-deformed states may be engineered as desired depending upon the equipment at hand for their suitable manufacture. In case precision manufacturing equipment is utilized, the clearance can be minimal: several thousands of an inch or even substantially less (just enough to permit the plates to rotate without substantial interference in order to permit a disengaged state). Hence, it takes little displacement to result in engagement, which can be quickly accomplished with minimal motion of plates 1 and 2. With suitable equipment, plates 1 and 2 might even be manufactured on a nano scale with a clearance in microns.

But it is not necessary to machine with high precision if not desired, since the invention can alternatively operate satisfactorily with large tolerances between the parts, if the very quickest actuation is not required.

As indicated above, the engagement between plate 1 and plate 2 is firm due to the leverage exerted upon the engagement surfaces 3 and receiving surfaces 4 by the relatively-large diameter of plates 1 and 2, as said plates deform.

If desired, progressive engagement can be provided by increasing the clearance between engagement surfaces 3 and receiving surfaces 4 from inside to outside, or vice versa, so that various sets of such surfaces engage sequentially. Alternatively, the same may be accomplished by predisposing one or both of plates 1 and 2 to exhibit a degree of concavity or convexity in their disengaged state, so that contact between them proceeds progressively from inside to outside, or vice versa.

Engagement surfaces 3 and receiving surfaces 4 need not be disposed precisely normal to plates 1 and 2: some tilt may be provided so that plates 1 and 2 may be moved towards each other as necessary or desirable to compensate for surface wear over time, while maintaining a desired clearance specification between engagement surfaces 3 and receiving surfaces 4.

Engagement surfaces 3 and receiving surfaces 4 are generally arranged in an annular configuration. The number of sets of such surfaces, and their size and positioning, may be varied as desired for the particular application. In the embodiment shown, there are three sets.

Plates 1 and 2 are connected to shafts 5 and 6, respectively, so that rotary power may be transmitted. Shaft 5 exerts engagement force near the center of plate 1, whereas shaft 6 exerts engagement force about the circumference of plate 2. In this manner it is provided that plate 1 deforms convexly, whereas plate 2 tends to deform concavely, as plates 1 and 2 approach and then engage each other. Due to the geometry resulting from the deformation of plates 1 and 2, engagement surfaces 3 are urged towards receiving surfaces 4, with said surfaces entering into firm contact with each other, as said plates deform convexly and concavely respectively; despite the fact that when plates 1 and 2 are undeformed, there may be clearance rather than interference between said surfaces so that rotation is not transmitted between said plates.

Shaft 5 and shaft 6 may optionally be provided with gear 7 and gear 8, respectively, as a means of power transmission to and from said shafts. Alternative and/or additional means of transmitting power to and from said shafts may optionally be chosen by the person skilled in the art. Shaft 5 and shaft 6 may be pushed to effect engagement of plate 1 and plate 2, as desired; or one or both of said shafts may be effectively connected to the other sides of said plates, so that engagement is effected by a pulling rather than a pushing motion. Or one shaft may be pulled and the other pushed; for example, shaft 5 may be pulled from its end nearest gear 8, instead of being pushed from its other end nearest gear 7. The principle is that plates 1 and 2 should be appropriately repositioned to engage each other.

The clutch may be made of plastic (e.g., WATERSHED XC 11222 when made by stereolithography), metal, composites, or other materials having suitable durability, resilience and heat-resistance for the intended application. Its surfaces may be treated, plated, or the like to enhance their properties. It may be suitably vented for air cooling, or enclosed for liquid cooling. It may be used with gas, electric, electromagnetic, steam, hydraulic, or other means of propulsion and actuation. Desired ball bearings, roller bearings, air bearings, or the like may be employed as necessary and appropriate for the intended application to reduce frictional forces.

Actuation may be by suitable manual, automatic, computer-controlled or other suitable activation means.

Control by a computer or microprocessor may be provided in order to synchronize the rotation speeds of plate 1 and plate 2 at the time of their engagement, to minimize surface wear from friction. Tachometers may provide inputs to the controller by sensing the respective rotation speeds.

In the case of electromagnetic actuation of the engagement of the clutch, a separate solenoid may be used for that purpose. The pulling force of the solenoid may be computer-controlled to assure smooth and firm actuation of the clutch, by varying the energy applied to the solenoid in the course of its travel from start to end.

Alternatively, in case the clutch is used with an electric motor as in a vehicle, the motor itself may act as the solenoid in that the motor's coil, when energized, may not only rotate but also displace itself axially sufficient to engage the clutch.

The clutch may be used, for example to engage and disengage an electric motor in the operation of an environmentally-efficient hybrid gas/electric vehicle. Due to the generally "pancake" shape which can effectively be chosen for use in making a clutch according to the invention, a shape which resembles that of an automotive wheel and its tire, the invention can be suitable for placement in the wheel well of a vehicle (e.g., inboard of a wheel and its tire). It may also be suitably configured for use in conjunction with an electric motor of the "pancake" configuration. Since hybrid gas/electric and all-electric vehicles may use more than one motor, requiring the use of more than one clutch, the use of one or more clutches according to the invention may be particularly advantageous for the manufacture of such vehicles.

Alternatively, the clutch may be employed within and installed between the motor and the chuck of an electric bench or hand drill. In this embodiment, one of shaft 5 or shaft 6 is driven by the motor; and the other of shaft 5 or shaft 6 serves to mount the chuck which in turn holds a drillpoint or the like. The clutch may alternatively be installed in a separate housing configured as a removable attachment for a drill or other such tool.

Pressing on the drillpoint forces plates 1 and 2 towards each other, so that rotation of the motor is transmitted to the drillpoint. As soon as the drillpoint breaks through the workpiece, it is no longer under pressure so that plates 1 and 2, by their natural resilience without particular need for supplemental springs or additional actuation or control mechanisms, are able to return to their rest positions and hence disengage to stop the transmission of rotary motion to the drillpoint. Therefore the drillpoint is unable to damage the workpiece by continued undesired residual rotation after the desired hole has been drilled through; and safety for the worker is enhanced since the drillpoint is not rotating except during the time when needed to penetrate the workpiece.

Figure 4:
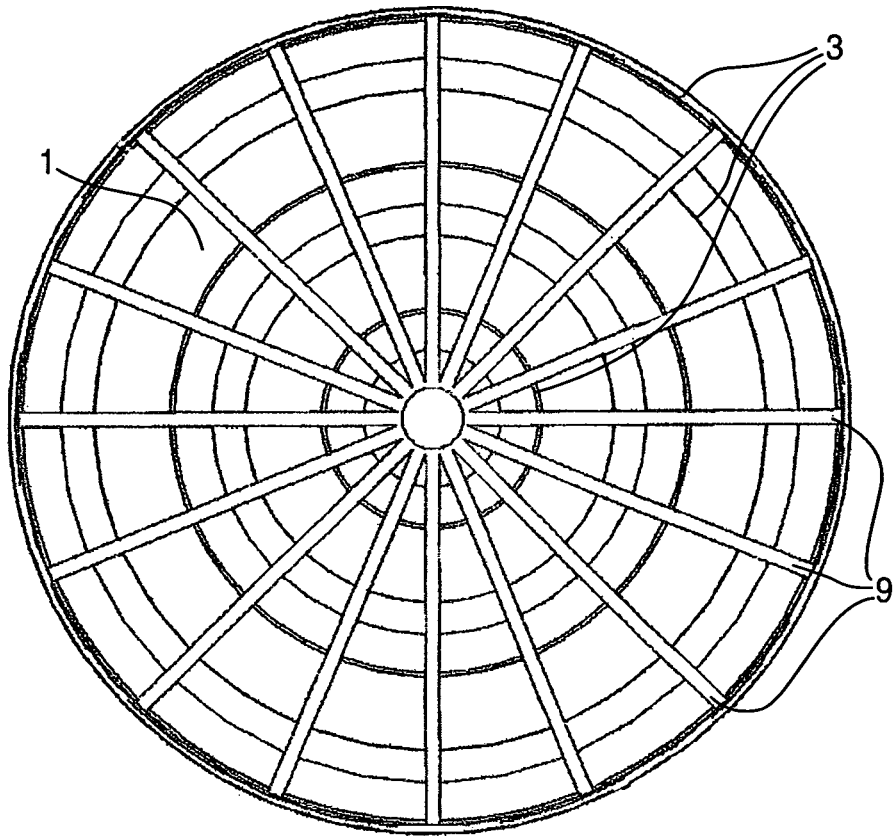
FIG. 4 is a top plan view of an embodiment of a first plate according to the invention.
Figure 5:
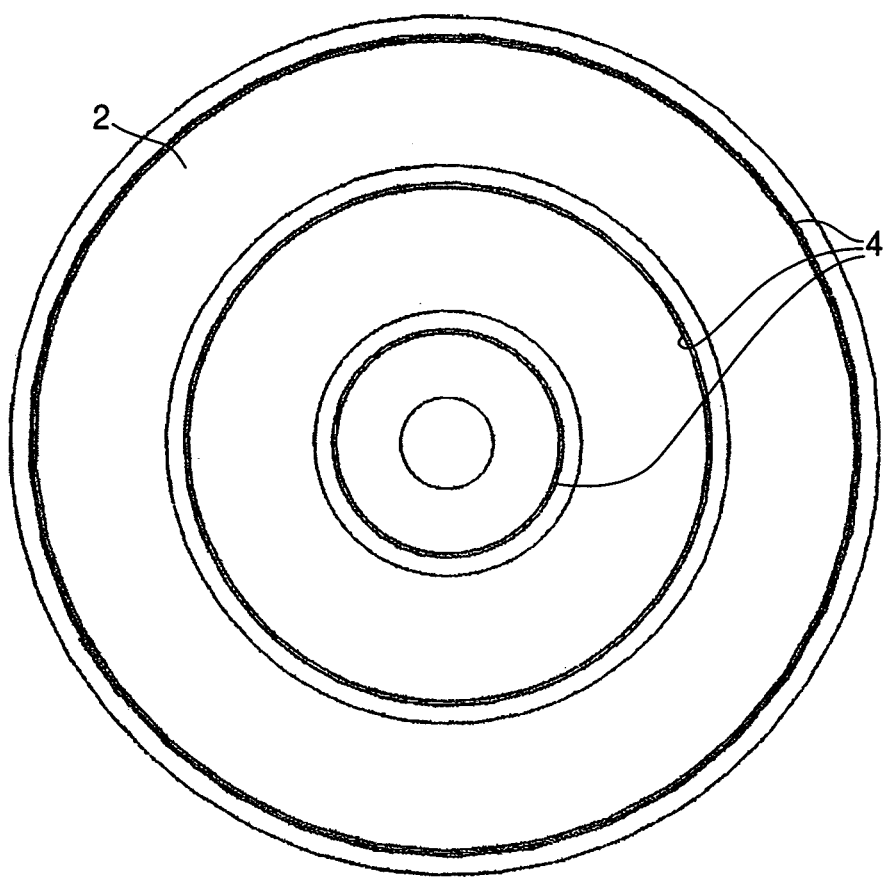
FIG. 5 is a bottom plan view of an embodiment of a second plate according to the invention.

Referring to FIG. 4, slots 9 may be provided in order to enhance flexibility of plate 1.

The invention is not limited to the exact embodiments and uses shown and described, and may be realized and implemented in such other ways as will be apparent to the skilled artisan, utilizing the teachings of the invention.

The invention claimed is:

1. A clutch comprising a first and a second plate each connected to a respective first and second shaft; said first and second plates being positioned with clearance there-between; said first shaft being positioned for concentrating a first engagement force sufficiently near the center of said first plate that it is subjected to deformation convexly upon application of said first engagement force; said second shaft being positioned for concentrating a second engagement force about a circumference of said second plate such that it is subjected to deformation concavely upon application of said second engagement force; said first plate being provided with engagement surfaces and said second plate being provided with receiving surfaces generally opposing said engagement surfaces; said engagement surfaces being urged towards said receiving surfaces as said first and second plates are subjected to deformation convexly and concavely, respectively, in response to relative axial motion between said first shaft and said second shaft; whereupon said deformation takes up said clearance between said engagement surfaces and said receiving surfaces for transmitting torque between said plates.

2. The clutch according to claim 1, said first plate being initially disposed in a first plane and said second plate being initially disposed in a second plane;
said engagement surfaces being oriented generally normal to said first plane; and said receiving surfaces being oriented generally normal to said second plane.

3. The clutch according to claim 1, said first plate having a first side disposed towards said second plate; said first side being pre-formed with a concave surface.

4. The clutch according to claim 1, said clutch being provided with a plurality of sets of engagement surfaces and respective receiving surfaces; said sets being of varying diameters; and said sets being substantially concentric about an axis of rotation.

5. The clutch according to claim 4, said first plate being initially disposed in a first plane and said second plate being initially disposed in a second plane;
said engagement surfaces being oriented generally normal to said first plane; and said receiving surfaces being oriented generally normal to said second plane.

6. The clutch according to claim 4, said first plate having a first side disposed towards said second plate; said first side being pre-formed with a concave surface.

* * * * *